March 27, 1945.     V. WALKER     2,372,536

METHOD OF PRODUCING OPTICAL SURFACES AND THE LIKE

Filed May 8, 1942

INVENTOR
Victor Walker,
BY
Beau, Brooks, Buckley, Beau.
ATTORNEYS

Patented Mar. 27, 1945

2,372,536

UNITED STATES PATENT OFFICE 2,372,536

METHOD OF PRODUCING OPTICAL SURFACES AND THE LIKE

Victor Walker, Fort Erie, Ontario, Canada, assignor to AlnCin, Inc., Buffalo, N. Y.

Application May 8, 1942, Serial No. 442,198

11 Claims. (Cl. 41—42)

This invention relates to the art of surface processing glass or kindred substances such as in connection with the manufacture of optical lenses, screens, prisms, or other fine glassware and the like. More specifically, the invention contemplates an improved method for fabricating precisely contoured glass or glass-like articles such as optical lenses, prisms, flats, or other curved or flat surfaced glass or glass-like articles.

In connection with the presently conventional grinding and polishing processes of the optical instrument manufacturing art it is customary, when manufacturing a glass lens for example, to apply successively finer grades of grinding abrasive to the glass stock piece by means of a rotating lap so that the surface of the stock piece is slowly reduced toward conformity with the prescribed final dimensions and surface contour of the finished article. Thus, the initial grinding operations function to remove the majority of the excess material of the stock piece and to bring the stock piece contour into approximate conformity with the prescribed final shape and size of the finished article, while the successively finer grinding operations are employed to further reduce the stock piece toward final form while eliminating the relatively deep scratches or other rugosities which are left upon the stock piece surface at the end of each preceding and relatively coarser grinding operation. Consequently, the abrasives employed in connection with the progressively finer grinding operations must be very carefully graded and carefully employed to attain a final product wherein the finished surface is uniformly abraded and rubbed by rouge or the like to produce the surface effect which is commonly termed as "polished." In this respect it is understood, of course, that the final stages of the polishing process will be carried out through use of a polishing agent of microscopical minuteness, and that for such purpose the finest grades of rouge or the like will be employed.

It has been determined that a typical optically ground and polished glass surface such as is provided in the presently conventionally fabricated form of optical lens appears upon only superficial examination to be structurally perfect and unmarred. Actually, however, the surface structures of such products are found upon close examination to comprise glass layers of distorted form as a result of gouging and flowage of the glass substance at the surface of the article as a result of the wiping operations employed to finally reduce and finish the stock piece. It has been definitely determined that the surface and sub- surface layers of such conventionally ground and polished glass objects comprise mechanically flowed and stressed glass structures of heterogeneous formation as distinguished from the perfect structures that they appear to be under superficial examination. This phenomenon has recently become recognized and authenticated by reports of studies by Sir George Beilby, and a report on this subject appeals in Vol. XXXI, No. 124, of the April 1937 issue of "Science Progress," which is published by G. I. Finch of London, England. The phenomenon is designated therein as "the Beilby layer" in honor of the author of the studies referred to.

In addition, it is now known that the surface layer portion of a conventionally ground and polished glass object is actually structurally disrupted as an effect of the abrasive granule action thereon which tends to tear the glass structure and to cause abrasive granules to become embedded therein. Therefore, as a result of the actions referred to hereinabove it is definitely known that although the finished surface of a conventionally ground and polished glass body appears superficially to be of perfectly smooth and uniform structure, it is actually heterogeneous and interspersed with minute fracture voids and/or inclusions of abrasive substances which are covered with wiped-over glass material during the final rouge polishing operations. Proof of this is found in the fact that when a conventionally ground and rouge polished glass surface is treated with an acid capable of reacting chemically with the iron oxide content of the rouge employed during the final polishing operations, the resulting chemical action causes "blooming" of the rouge material which had been forced into the crevices of the glass surface to such an extent as to be readily visible. Hence, in such case the finished article is actually of inferior light transmitting and refractive properties.

Another serious disadvantage of presently conventional or prior art methods for grinding and polishing lenses or the like is due to the relatively opaque condition of the glass stock piece surface during the processes of grinding. Hence, any unusually deep scratches imposed thereon by the action of an occasional oversized abrasive granule cannot be readily detected prior to the completion of the rouging or final polishing operations. Thus, it is the usual experience of conventional optical grinding and polishing shops to carefully process many glass stock pieces through the successive steps of grinding and polishing with progressively finer grades of grinding and polishing abrasives only to arrive finally at a polished clear surface wherein relatively deep grooves or scratches appear, thus rendering the articles useless for optical purposes and increasing tremendously the overall manufacturing costs of the enterprise, whereby the costs of the acceptable products of the business are proportionately increased.

Also, an additional serious disadvantage of the prior art methods referred to is that if relatively deep scratches are imposed upon the stock piece prior to the final polishing operation thereon, the polishing operation will in many instances wipe the glass material over the scratches or recesses to provide a result which appears on the surface to be a perfectly regular and solid glass structure. Actually, however, such a structure will deteriorate under the action of surrounding atmosphere, and in due time will show the effects which are commonly known in the optical art as "weathering," whereby the surface becomes so marred as to be spoiled.

The present invention contemplates a novel combination reducing and cleaning process for reducing glass or glass-like stock to accurately contoured form in such manner as to avoid the disadvantages and objections referred to hereinabove. One of the objects of the present invention is to provide an improved processing method of the character described whereby improved opportunity for detecting surface or sub-surface mars or the like immediately of the grinding and finishing stages is provided, whereby expense and loss of time incidental to finishing of defectively ground or otherwise unsuitable stock pieces may be avoided. Another object of the present invention is to provide an improved method for the purpose stated whereby the total time and expense involved in grinding and finishing an article may be substantially reduced. Another object of the present invention is to provide an improved method for the purposes stated whereby the finished article is of improved structural formation and optical characteristics. Another object of the present invention is to provide an improved method for the purpose stated which involves the features and advantages stated hereinabove in combination with reduction of stresses and strains within the stock piece material. Other objects and advantages of the invention will appear from the specification hereinafter.

Figure 1:
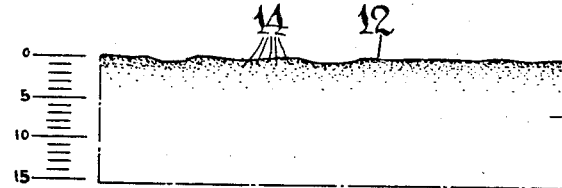
Fig. 1 is an elevation on a greatly enlarged scale of a typical glass stock piece fragment prior to being processed in accord with the method of the invention.

The invention is illustrated by way of example in the drawing in connection with the fabrication of a glass article such as an optical lens or flat, or the like, and for this purpose the stock piece 10 is initially formed by any suitable molding or pressing or cutting operation or any other shaping process to have its outer surface 12 shaped approximately similar to the prescribed shape of the finished article. Thus, in this case the surface portion 12 of the stock piece will be generally either flat or curved, but it will be understood that the surface 12 will be expected to deviate from proper formation because of irregularities which are invariably present in glass molding or cutting processes. Also, it will be understood that this roughly shaped stock piece surface will ordinarily be of crust-like formation and may include foreign substances as indicated at 14 which are absorbed from contact with the shaping mold or the like, and that this crust must be removed from the stock piece before optimum light transmission and optical characteristics can be achieved.

Figure 2:
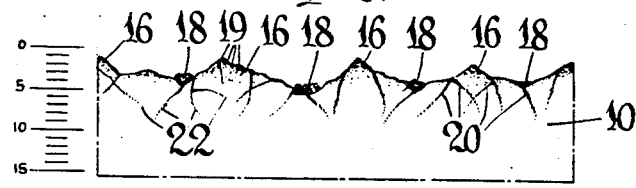
Fig. 2 is a view corresponding to Fig. 1 showing the same stock piece subsequent to application of a grinding or coarse reduction step of the method of the invention thereon.

Fig. 2 illustrates the stock piece of Fig. 1 subsequent to treatment of the stock piece to a rough grinding process which may be performed either by means of a bonded abrasive tool or by means of uniformly graded loose abrasive granules moved relative to the stock piece while being pressed thereagainst by means of a conventional type grinding lap (not shown). Thus, the stock piece will, at this stage of the operation, resemble ordinary ground glass; and it will be understood that the coarseness of the ground surface will depend upon the grade of abrasive last used thereon. The grinding operation may be conducted in accord with any presently conventional optical grinding methods, and the loose abrasives employed against the stock piece will preferably be of progressively finer grades so as to arrive at the desired elimination of the crust portion 14 of the stock piece without leaving excessively deep scratches or other irregularities on the stock piece surface. Thus, at this stage of the operation the stock piece will appear somewhat as illustrated in Fig. 2 as having a typical ground glass type surface comprising series of minute cusps 16, and the depressions and side wall portions of the cusps 16 will be found to be coated with debris consisting of fragments of ground glass and abrasive which have been lodged in the surface as indicated at 18 during the preceding grinding operation.

Figure 3:
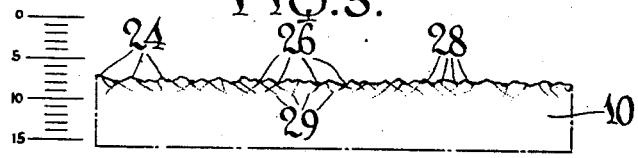
Fig. 3 is a view corresponding to Fig. 2 subsequent to a later fine grinding operation thereon.

Also, the cusp walls are coated with crystallized glass fragments as indicated at 19. These residue substances referred to provide substantially opaque light screening effects upon the stock piece surface whereby it is impossible to view the interior or surface structures thereof by means of light transmitted through the body of the stock piece. Thus, it is extremely difficult to properly inspect a stock piece for the presence of relatively deep scratches or marrings or internal inclusions or striae or other imperfections when it is in this stage of manufacture. Also, due to the brittle nature of the glass and to the violent gouging action of the abrasives thereon during the initial grinding steps of the shaping process, the sub-surface structure of the stock piece at this stage of manufacture invariably includes minute fracturings such as are indicated at 20 (Fig. 2) and sub-surface stresses and strains as indicated at 22 which do not appear to the naked eye except when studied with such instruments as the polariscope. To reduce the coarse cusp and debris and fracture structures of the stock piece of Fig. 2, it may be next subjected to a further conventional fine grinding operation by means of successively finer grades of abrasive with the result that the stock piece surface will then be of substantially the same character but of a reduced dimension order as illustrated by Fig. 3. In such case the surface will comprise series of cusps as indicated at 24; debris as indicated at 26; and sub-surface fractures and strains as indicated at 28 and 29, respectively.

Thus, it will be appreciated that if the stock piece of Fig. 3 were to be next processed by means of further fine grinding or polishing operations through use of abrasive or rouge or the like as is conventional in the optical grinding polishing art, the further grinding and polishing processes would be imposed against the debris containing and fractured surface portion of the stock piece in such manner as to further embed the debris particles 26 into the glass material and to wipe the glass material so as to cause flowage of glass over the debris in such manner as to provide a superficially glossy surface. However, it will be understood that in such case the final surface will still include the debris and fractured and stressed formations referred to, and that therefore the finished article cannot be of optimum light transmissive or other optical characteristics.

As distinguished from the above, the method of the present invention involves intermediate treatments of the stock piece by means of a glass-reactive chemical agent in such manner as to simultaneously remove the debris particles from the ground glass surfaces and to round off the acute angle formations of the cusps thereof. This chemical process involves an action entirely distinct from any conventional glass etching operation, for example, because it will be understood that an etching process would simply provide a chemical attack upon the glass material in such manner as to leave further opaque residues adhering to the glass surfaces. In the case of the present invention, however, the stock piece is cleared of the debris and altered with respect to its cusp formation by means of a special combination of chemical agents having the property to combine to provide perfect clearing of the ground glass surface and rounding of the cusp structures without incident etching action upon the glass material.

The reagents employed will of course be varied in accord with the chemical and physical properties of the glass material of the stock piece, but if the stock piece is of ordinary soda-lime-silicate type glass for example I have found that the chemical reagent may suitably comprise a mixture of hydrofluoric acid and sulphuric acid in water wherein the proportion by weight of sulphuric acid greatly exceeds the proportion of hydrofluoric acid. The actual ratio of these acids will depend upon the temperature of the bath and the duration of the treatment. For example, satisfactory results have been obtained by employing baths wherein the ratio of hydrofluoric acid to sulphuric acid ranged between 1 to 5 and 1 to 10; and a 1 to 8 bath has been operated very satisfactorily at temperatures in the neighborhood of 150° F. However, the temperature of the bath and the duration of the treatment may be varied over wide ranges, and the process may be conducted for example at ordinary room temperatures or at elevated temperatures up to slightly below the boiling point of the acid bath. Preferably, the concentrations of the acids will be reduced as the temperature is raised to avoid too rapid an acid reaction, but it is also preferred to increase the ratio of sulphuric acid to hydrofluoric acid as the temperature is increased to avoid partial deposition of reaction products of the glass and hydrofluoric acid action on the stock piece.

I have found that by washing the ground surface portion of the stock piece either at the stage illustrated by Fig. 2 or by Fig. 3 with an acid composition of this character, the hydrofluoric acid ingredient thereof will attack the glass material to dislodge all debris from the native glass of the stock piece and to simultaneously round off the angular formations of the cusps thereof. Apparently, the sulphuric acid ingredient of the composition immediately reacts with the products of the glass and hydrofluoric acid reaction to form sulphate salts which do not tend to adhere to the stock piece, as do the products of a glass and straight hydrofluoric acid reaction under normal conditions.

Figure 4:
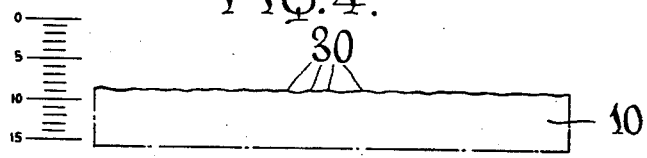
Fig. 4 is a view corresponding to Fig. 3 subsequent to later application of a chemical clearing step of the method of the invention thereon.

The acid surface clearing step of the method of the invention may be conveniently practiced by simply dipping the ground stock piece surface into a bath of the acid mixture referred to and allowing the acid reactions to continue for such length of time as may be necessary to provide the complete clearing away of the debris referred to. Thus, the stock piece will then appear as illustrated in Fig. 4 and particular attention is called to the fact that when in this condition of manufacture the stock piece surface comprises a series of relatively low domes or wave-like formations indicated at 30.

Figure 5:
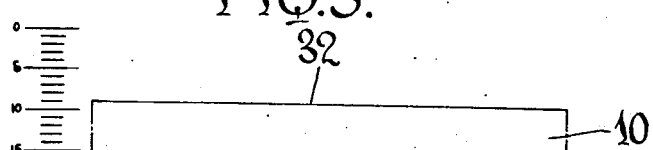
Fig. 5 is a corresponding view of the stock piece surface formation upon final finishing thereof.

It is particularly noteworthy that at this stage of the manufacturing operation the stock piece has been perfectly cleared at all surface portions thereof so as to be of optimum light transmitting capacity, and that since all of the debris matter of the earlier grinding operations has been removed therefrom any relatively deep surface scratches or other mars will now be readily discernible. Thus, the stock piece may be inspected at this stage of the manufacturing process with utmost facility to locate any such defects, whereby the stock piece may be discarded at this time if it is found to contain undesirable imperfections without having first expended upon it the customary tedious finishing and polishing steps, as practiced in the conventional optical manufacturing art. If, however, the stock piece withstands inspection at this stage of its manufacture, it may, for example, next be subjected to a fine polishing action, as by means of rouge or other suitably fine abrasive under a rapidly moving lap whereby the wavy formation of the surface illustrated in Fig. 4 will be completely reduced to perfectly regular form as illustrated at 32 in Fig. 5. Particular attention is called to the fact that whereas the chemically cleared surface of the stock piece as illustrated at 30 in Fig. 4 is not only free of residue substances from prior grinding operations such as abrasive and crystallized glass grains, the surface 30 is also of such smoothly undulating form that during the subsequent rouge polishing operation it is impossible for foreign particles to lodge within the depressions of the surface 30. Hence, the final rouge polishing operation acts solely to level the wavy undulations of the surface 30 to the regular formation illustrated at 32 in Fig. 5, and therefore it will be understood that this final finishing operation leaves a regular finished surface and subsurface structure composed solely of native glass substance which is completely free from foreign inclusions or wiped-over voids such as invariably occur in articles which are ground and polished by conventional methods.

Particular attention is also called to the fact that, as illustrated in the drawing, whereas the initial and relatively coarser grinding operations invariably impose sub-surface fracturing and stress effects upon the stock piece as illustrated at 20 and 22, respectively, in Fig. 2 and at 28 and 29, respectively, in Fig. 3; the chemical clearing step of the method of the invention which follows the preceding grinding step thereof is carried out to sufficient extent to remove the glass stock to below the level of the fractured zone thereof. As an incident to this stock reduction referred to, the removal of the debris which has been previously rammed into the crevices made by the grinding action, and the rounding off of the cusped formation of the ground surfaces, operates to alleviate the stresses and strains within the sub-surface structure of the stock piece, and consequently the strains which are indicated at 29 in Fig. 3 are not present in the stock piece when in the condition thereof illustrated by Fig. 4. Hence, it will be understood that the chemical clearing steps of the method of the invention perform multiple functions in that they simultaneously remove debris and hence prevent the debris from being subsequently rammed further into the stock piece; round off the cusp structure to low dome form and thus prevent lodgment of particles between the domes during the final polishing steps; and relieve the stock piece of all stresses and strains which have been previously imposed thereon, so that the stock piece when in the stages illustrated by Figs. 4 and 5 comprises nothing but pure native glass of homogeneous structure and regular surface form. The calibrated scale adjacent each of the figures of the drawing is intended to provide an indication of the relative extents of reduction of the stock piece during the successive stages of the operations of the invention thereon.

As stated before, the chemical reagent employed for the clearing step of the method of the invention will depend upon the chemical constituency of the stock piece. For example, if the stock piece comprises a soda-lime-silicate glass with a substantial proportion of lead the chemical treatment will preferably include use of a nitric acid solution to such degree as to react with the lead content thereof coincidentally with reduction of the silica content thereof. More specifically, if the lead content is of relatively low proportion compared to the silica content of the stock piece, a small percentage of nitric acid may be added to the hydrofluoric and sulphuric acid solution referred to hereinabove. As the lead content of the stock piece increases, however, the proportion of nitric acid must be likewise increased; and if the lead content of the stock piece predominates it may be advisable to initially wash the stock piece surface with a nitric acid solution and then to wash it with a hydrofluoric acid solution. Or, if the lead and silica contents are nearly equal, the nitric acid and hydrofluoric acid solutions may be mixed to provide a single bath for treating the stock piece surface in a single operation.

By way of further example, if the stock piece comprises a soda-lime-silicate type of glass containing an appreciable portion of barium, it has been found to be desirable to substitute phosphoric acid for the sulphuric acid ingredient of the soda-lime glass treating bath first mentioned hereinabove. Thus, the bath for treating a barium crown glass will comprise a mixture of solutions of hydrofluoric acid and phosphoric acid. It appears that the barium fluorides resulting from the hydrofluoric acid action upon the glass are relatively insoluble in sulphuric acid but are readily soluble and decomposed by phosphoric acid. Consequently, if phosphoric acid be employed in such case there will be no tendency for the fluorides to attach to the stock piece in such manner as would provide the opaque coating effects commonly referred to as "etched" effects. If on the other hand the stock piece comprises a barium flint type glass; that is, a soda-lime silicate glass with appreciable lead and barium contents, a bath comprising a mixture of hydrofluoric and nitric and phosphoric acids will provide suitable results, and it will be understood that the relative proportions of the different acid solutions in the bath will be varied in accord with the proportions of the silica and lead and barium ingredients of the stock piece. Or, as explained hereinabove, in lieu of mixing the acid solutions to provide a single bath, they may be separately and alternately applied to the stock piece in a series of chemical treating steps, as may be preferred.

If the glass stock piece is of either crown or flint glass type and contains in addition a substantial proportion of boron, then a further ingredient is preferably added to the chemical bath or baths with which the crown glass stock piece surface is treated so as to obtain a suitable reaction with the boron ingredient. For this purpose sodium hydroxide may be employed, or some other suitable caustic substance, and to prevent excess neutralization of the acid and caustic ingredients, they are preferably applied to the stock piece in separate operations. The relative degrees of treatment of the stock piece by the acid and caustic reagents will depend upon the proportion of boron in the stock piece. For example, if the stock piece contains approximately equal proportions of silica and boron, it is preferred to employ alternate baths of caustic and hydrofluoric-sulphuric acid solutions.

It is to be particularly noted that although the accompanying drawing illustrates the method of the present invention in connection with the fabrication of flatly surfaced articles, the invention is of course equally applicable to processing variously curved surfaces. For example, when fabricating a convex lens surface in accord with the method of the present invention the stock piece will be initially reduced by means of a grinding operation under a suitably shaped lap to the approximate form and dimension of the finished surface. However, in order to arrange for final grinding and polishing of the lens blank subsequent to intermediate chemical clearing steps of the method of the invention, the grinding steps will be conducted in such manner as to leave sufficient stock material to be acted upon by the chemical clearing reagent and the final polishing operations so that the finished surface will be at the prescribed dimensional level and of the prescribed curvature. In this latter respect particular attention is called to the fact that because the chemical reaction acts against the curved surface stock piece at all surface portions thereof and in directions toward the geometric center of the curve; the chemical reaction process in effect tends to uniformly shorten the curvature radius at all portions of the stock piece. This is entirely different from the action of a grinding lap as employed in connection with optical polishing and grinding operations wherein the work piece contacting surface of the lap is pre-shaped to complement the prescribed curvature of the finished article and operates upon the stock piece to simply reduce the level of the surface thereof while maintaining the same curvature radius throughout the entire reduction process.

Consequently, in connection with the method of the present invention, if the initial stock piece shaping and grinding step is effected by means of an abrasive lap, the lap must be formed to a curvature having a radius slightly larger than the radius of the prescribed curvature of the finished article. Hence, subsequent to the grinding process, the chemical clearing reaction reduces the partially prepared surface uniformly in all radial directions so as to bring the final curvature of the finished article into conformity with the prescribed curvature radius.

It is to be particularly noted that the present invention contemplates employment of any number of chemical debris-clearing steps such as have been referred to hereinabove intermediately of any of the multiple abrasive shaping and final finishing steps in connection with the stock piece processing, as may be preferred; and that the debris clearing step or steps may be employed at any stage or stages throughout the processing method to facilitate the action of the abrading steps as explained hereinabove. In every case it has been found that the employment of one or more of such clearing operations invariably reduces the total amount of grinding and/or polishing and/or other finishing operations which may be required to provide the perfectly finished final product. This is because the chemical treatment operates to reduce the stock piece toward the desired level and also rounds off the angular cusp formations thereby reducing the total surface area presented to succeeding grinding or polishing operations.

Also, it has been found that the combination mechanical-chemical surface processing method of the present invention provides important advantages with respect to control of the finishing operations subsequent to application of the chemical steps thereof. For example, it has been found that application of a relatively fine grinding process to a stock piece which has been previously coarse ground and cleared as explained hereinabove will initially produce on the stock piece surface a speckled appearance resulting from the fact that the relatively high portions of the surface become dulled by the fine grinding while the relatively low portions thereof remain bright and sparkly. Thus, an accurate guide is furnished for the fine grinding process because it will be apparent that until such time as all of the bright points are eliminated the fine grinding reduction process must be continued to obtain accurate levelling of the surface and elimination of any relatively deep scratches or gouge marks which were made by the coarse grinding operation.

It is obvious that in the absence of such intermediate brightening of the surface structure there would be no such guide for the fine grinding process, and that in such case only upon subsequent polishing of the surface would the presence of such scratches or gouge marks be revealed. Thus, it will be understood that a fine ground surface structure fabricated in accord with the method of the present invention will be of superior uniformity with respect to its surface formation, and that because the debris of the initial coarse grinding operations thereon had been removed prior to the finishing or fine grinding operations thereon, the finished surface will be more free from impregnation by abrasive and other debris particles such as would otherwise result from forcing of the coarse grinding debris into the surface structure during the fine grinding process. Consequently, such an article will provide an image retaining screen or the like of superior qualities. Or, as explained hereinabove, such an article may then be further processed to a polished surface of superior characteristics in a reduced time and at a reduced cost.

Although only a few forms of the invention have been shown and described in detail, it will be apparent to those skilled in the art that the invention is not so limited but that various changes may be made therein without departing from the spirit of the invention or the scope of the appended claims.

I claim:

1. The method of processing a glass stock piece comprising the steps of shaping the stock piece while providing the shaped structure thereof of serrated form, treating said serrated structure with a glass-reactive chemical solution to remove therefrom the debris of said shaping and to brighten the surfaces of said serrated structure, and finally reducing said serrated structure by means of a levelling abrasion process until all of said brightened surface portions are eliminated.

2. The method of processing a glass stock piece comprising the steps of abrading the stock piece to provide a shaped surface structure thereof of serrated form, treating said serrated structure with a glass reactive chemical solution to remove therefrom the debris of said shaping and to brighten the surfaces of said serrated structure, and reducing said serrated structure by means of a levelling abrasion process until substantially all of said brightened surface portions are dulled.

3. The method of processing a glass-like stock piece comprising the steps of shaping the stock piece so as to have a surface thereof of serrated form, treating said serrated surface with a stock piece reactive chemical solution to remove therefrom the debris of said shaping and to brighten the facets thereof, and reducing said serrated surface structure by means of a levelling abrasion process until all of said brightened facet portions are eliminated.

4. The method of grinding a glass stock piece comprising the steps of coarse grinding the stock piece so as to leave a surface structure thereof of serrated form, treating said serrated surface structure with a glass-reactive chemical solution to remove therefrom the debris of said coarse grinding and to brighten the facets of said serrated structure, and finally fine grinding serrated structure until substantially all of said brightened facet portions are eliminated.

5. The method of surface processing a soda-lime-lead-silicate glass article, comprising the steps of mechanically reducing a glass stock piece to approximate final form, applying a hydrofluoric-sulphuric-nitric acid solution to said reduced surface to chemically reduce the total surface area thereof and to clear said surface of the debris of said reducing step, and further mechanically reducing said cleared stock piece surface toward final prescribed form.

6. The method of surface processing a soda-lime-lead-silicate glass stock piece comprising the steps of abrading said stock piece to approximate final form, applying a solution of hydrofluoric and sulphuric and nitric acids and water to said abraded surface to clear said surface of the debris of said abrading step, inspecting said abraded and cleared stock piece, and abrasion polishing said stock piece to final prescribed form.

7. The method of surface processing a soda-lime-barium-silicate glass article, comprising the steps of mechanically reducing a glass stock piece to approximate final form, applying a hydrofluoric-sulphuric-phosphoric acid solution to said reduced surface to reduce the total surface area thereof and to clear said surface of the debris of said reducing step, and further mechanically reducing said cleared stock piece surface toward final prescribed form.

8. The method of surface processing a soda-lime-boron-silicate glass article, comprising the steps of mechanically reducing a glass stock piece to approximate final form, applying caustic and hydrofluoric-sulphuric acid solutions to said reduced surface to clear said surface of the debris of said reducing step, and further mechanically reducing said cleared stock piece surface toward final prescribed form.

9. The method of surface processing a soda-lime-boron-silicate glass article, comprising the steps of abrading a glass stock piece to approximate final form, applying caustic and hydrofluoric-sulphuric acid solutions to said abraded surface to clear said surface of the debris of said abrading step, and polishing said cleared stock piece surface to final prescribed form.

10. The method of surface processing a glass stock piece into curved surface form, comprising the steps of abrading said stock piece to approximate final form by means of an abrading tool having a curvature radius somewhat greater than the radius prescribed for the finished article, and applying a glass-reactive chemical solution to said abraded surface to clear siad surface of the debris of said abrading step and to reduce said surface more nearly to the prescribed final form.

11. The method of surface processing a glass stock piece comprising the steps of primarily mechanically shaping said stock piece to approximate final form, applying thereto a glass reactive chemical solution to clear said surface of the debris of said shaping operation, secondarily mechanically shaping said clear surface more closely to prescribed form, and then finally polishing said stock piece to final prescribed form.

VICTOR WALKER.